(12) United States Patent
Wang et al.

(10) Patent No.: US 12,522,953 B2
(45) Date of Patent: Jan. 13, 2026

(54) PHASE CHANGE FLAME RETARDANT FIBER MATERIAL AND PREPARATION METHOD FOR THERMAL MANAGEMENT OF LITHIUM-ION BATTERY IN ENCLOSED SPACE

(71) Applicant: NANJING TECH UNIVERSITY, Nanjing (CN)

(72) Inventors: Zhirong Wang, Nanjing (CN); Yuxin Zhou, Nanjing (CN); Junling Wang, Nanjing (CN); Yuhui Xia, Nanjing (CN); Haoze Yang, Nanjing (CN); Wenxi Wang, Nanjing (CN); Peng Dong, Nanjing (CN); Fan Yi, Nanjing (CN)

( * ) Notice: Subject to any disclaimer, the term of this patent is extended or adjusted under 35 U.S.C. 154(b) by 492 days.

(21) Appl. No.: 18/115,357

(22) Filed: Feb. 28, 2023

(65) Prior Publication Data
US 2023/0340702 A1   Oct. 26, 2023

(30) Foreign Application Priority Data

Apr. 21, 2022   (CN) ......................... 202210419787.X

(51) Int. Cl.
*D01F 8/16* (2006.01)
*D01D 1/02* (2006.01)
(Continued)

(52) U.S. Cl.
CPC ................ *D01F 8/16* (2013.01); *D01D 1/02* (2013.01); *D01D 5/0038* (2013.01); *D01D 5/34* (2013.01);
(Continued)

(58) Field of Classification Search
CPC .... D01F 8/16; D01F 8/08; D01F 1/07; D01D 1/02; D01D 5/0038; D01D 5/34;
(Continued)

(56) References Cited

U.S. PATENT DOCUMENTS

2007/0089276 A1* 4/2007 Dugan ................... D02G 3/404
19/144
2019/0375939 A1* 12/2019 Wei ....................... C08K 5/0066

* cited by examiner

*Primary Examiner* — Aiqun Li
(74) *Attorney, Agent, or Firm* — Shen Huang

(57) ABSTRACT

The present disclosure discloses a phase-change flame-retardant fiber material for thermal management of a lithium ion battery in a closed space and a preparation method. The phase-change flame-retardant fiber material is prepared in a coaxial electrostatic spinning manner and includes a composite phase-change fiber material PASA-TPU at a core part and a flame-retardant fiber material TB-PAN wrapping a surface of the core part. The composite phase-change fiber material is well wrapped with the flame-retardant fiber material, and the lithium ion battery wrapping the whole phase-change flame-retardant fiber material in the closed space is subjected to charge-discharge cycle; the result shows that the surface temperature of the battery can be effectively reduced by about 20° C. by the material, and the material can effectively play a role in multiple cycle processes; the whole material has an excellent and stable heat absorption effect, and has no leakage and collapse; and the phase-change flame-retardant fiber material only has thermal shrinkage and blackening phenomena and is not combusted after being ignited by open fire for over 20 s. Therefore, the phase-change flame-retardant fiber material of the present disclosure has a relatively good flame-retardant effect compared with other phase-change materials.

1 Claim, 6 Drawing Sheets

(51) Int. Cl.
*D01D 5/00* (2006.01)
*D01D 5/34* (2006.01)
*D01D 7/00* (2006.01)
*D01F 1/07* (2006.01)
*D01F 8/08* (2006.01)
*H01M 10/0525* (2010.01)
*H01M 10/653* (2014.01)
*H01M 50/383* (2021.01)

(52) U.S. Cl.
CPC ................ *D01D 7/00* (2013.01); *D01F 1/07* (2013.01); *D01F 8/08* (2013.01); *H01M 10/0525* (2013.01); *H01M 10/653* (2015.04); *H01M 50/383* (2021.01); *D10B 2321/10* (2013.01); *D10B 2331/10* (2013.01); *D10B 2401/04* (2013.01); *D10B 2505/00* (2013.01)

(58) Field of Classification Search
CPC .... D01D 5/003; D01D 5/0069; D01D 5/0076; D01D 7/00; H01M 10/0525; H01M 10/653; H01M 50/383; D10B 2321/10; D10B 2331/10; D10B 2401/04; Y02E 60/10
See application file for complete search history.

PHASE CHANGE FLAME RETARDANT FIBER MATERIAL AND PREPARATION METHOD FOR THERMAL MANAGEMENT OF LITHIUM-ION BATTERY IN ENCLOSED SPACE

TECHNICAL FIELD

The present disclosure belongs to the technical field of thermal management batteries of lithium ion batteries, and particularly relates to a phase-change flame-retardant fiber material for thermal management of a lithium ion battery in a closed space and a preparation method.

BACKGROUND ART

A lithium ion battery may generate a large amount of heat in a long-time high-rate charging and discharging process. If the heat is not dissipated in time, a series of side reactions such as decomposition of a solid electrolyte interphase (SEI membrane) and shrinkage of the membrane may be triggered, and more heat and a large amount of gas may be generated, which cause sudden increase of the internal pressure and temperature; thermal runaway is finally caused; and consequently, safety accidents such as electrolyte leakage, combustion and even explosion may be caused. The existing technical means for thermal management of the lithium ion battery are mainly concentrated on air cooling, liquid cooling, phase-change material cooling and other modes.

A phase-change material cooling technology is regarded as an important measure for a next-generation battery thermal management technology because of its advantages of high heat storage density, small temperature change during phase change, simple and compact structure, etc. However, the phase-change material has the defects such as relatively poor thermal stability, and easy collapse of phase-change component form after heat absorption and liquefaction. For the technical problems, in the prior art, in Phase 8 of Volume 40 of "Research on Preparation and Heat Storage Performances of Electrostatic Spinning PA-SA/PET-MWNTs Composite Phase-Change Fibers" and "Novel Chemical Materials" compiled by Ke Huizhen, Cai Yibing, Wei Qufu and Xu Yang, a form-fixed composite phase-change fiber is disclosed, which can relieve the problem of easy collapse of the form and also has the problem of easy leakage of the phase-change material after phase change. In addition, an invention with application No. 2018102984681 and with a tile of method for preparing phase-change heat-storage fiber membrane having core-shell structure by coaxial electrostatic spinning technology; the coaxial electrostatic spinning mode is adopted, and the phase-change material is wrapped in a polymer substrate, thereby solving the problem of easy leakage of the fluidity of the phase-change material. Most of the phase-change materials and the polymer substrate materials are organic substances which have certain fire risk and easily "aggravate the circumstance" if the lithium ion battery is out of heat control.

Therefore, in order to solve the limitation of the prior art, the present disclosure researches a phase-change flame-retardant fiber material which has a good heat absorption effect, can ensure that the lithium ion battery is circularly charged and discharged at a safe temperature and cannot cause leakage and collapse after phase change, and has a flame-retardant effect. The phase-change flame-retardant fiber material has a great significance in a thermal management system of the lithium ion battery. In addition, the phase-change flame-retardant fiber material is low in material consumption and low in space occupancy, so the pressure of environmental pollution can also be relieved to a certain extent.

SUMMARY OF THE INVENTION

An objective of the present disclosure is to provide a phase-change flame-retardant fiber material for thermal management of a lithium ion battery, which is good in heat absorption effect, low in space occupancy and stable in form and solves the technical problems that a phase-change material in the prior art is poor in thermal stability, easy to collapse in form, easy to leak and easy to combust.

In order to solve above technical problems, the present disclosure adopts the following solutions:

A phase-change flame-retardant fiber material for thermal management of a lithium ion battery in a closed space is prepared in a coaxial electrostatic spinning manner, and includes a composite phase-change fiber material PASA-TPU at a core part and a flame-retardant fiber material TB-PAN wrapping a surface of the core part;

The composite phase-change fiber material PASA-TPU comprises the following components: palmitic acid, stearic acid and thermoplastic polyurethane elastomer rubber; and a mass ratio of the palmitic acid powder to the stearic acid powder to the thermoplastic polyurethane elastomer rubber particles is 3:2:1.

The flame-retardant fiber material TB-PAN includes the following components: polyacrylonitrile, boron nitride and triphenyl phosphate based on a mass ratio of 2:2:3.

A preparation method of a phase-change flame-retardant fiber material for thermal management of a lithium ion battery in a closed space includes:

step 1, preparation of a PASA eutectic mixture:

weighing a certain amount of palmitic acid powder and stearic acid powder; placing the palmitic acid powder and the stearic acid powder into a beaker and uniformly mixing; then placing the beaker in a drying oven for maintaining the temperature so as to melt the powder; placing the molten palmitic acid and stearic acid mixed solution in an ultrasonic machine for ultrasonic stirring; then naturally cooling to obtain the PASA eutectic mixture; and grinding the PASA eutectic mixture into powder for subsequent preparation of a spinning solution;

step 2, preparation of a PASA-TPU spinning solution:

weighing a certain amount of thermoplastic polyurethane elastomer rubber particles and the PASA powder prepared in the step 1; dispersing the thermoplastic polyurethane elastomer rubber particles and the PASA powder in a N,N-dimethylformamide solution; and carrying out magnetic stirring for several hours to obtain the PASA-TPU spinning solution;

step 3, preparation of a TB-PAN spinning solution:

respectively weighing a certain amount of polyacrylonitrile powder, boron nitride powder and triphenyl phosphate powder; dispersing and dissolving the polyacrylonitrile powder, the boron nitride powder and the triphenyl phosphate powder in the N,N-dimethylformamide solution; and carrying out magnetic stirring for several hours to obtain the TB-PAN spinning solution;

step 4, preparation of a PASA-TPU phase-change flame-retardant fiber material in an electrostatic spinning manner:

respectively extracting the PASA-TPU spinning solution prepared in the step 2 and the TB-PAN spinning solution prepared in the step 3 into two injectors; connecting the injectors to coaxial spinning needles; controlling the liquid discharge of a PASA-TPU injector by an injection part A in an electrostatic spinning machine; controlling the liquid discharge of a TB-PAN injector by an injection part B; fixing aluminum foil paper on a receiver for receiving fibers; controlling the environment temperature and humidity; setting the rotation speed of the receiver and the liquid discharge speed of the injection part A and the injection part B; setting a horizontal movement distance, a distance between the spinning needles and the receiver, the positive voltage and negative voltage of the electrostatic spinning machine; and then starting the electrostatic spinning machine to prepare the phase-change flame-retardant fiber material.

Further preferably, the method includes:

step 1, preparation of the PASA eutectic mixture:

weighing 7.56 g of palmitic acid powder and 5.04 g of stearic acid powder; placing the palmitic acid powder and stearic acid powder in a 50 ml beaker and uniformly mixing; then placing the beaker in the baking oven with a temperature of 90° C., and maintaining the temperature for 2 h; preheating the ultrasonic machine until the temperature reaches 90° C.; placing the molten PA and SA mixed solution in the ultrasonic machine with a temperature of 90° C.; carrying out ultrasonic treatment for 10 min; then naturally cooling to obtain the PASA eutectic mixture; and grinding the PASA eutectic mixture into powder for subsequent preparation of the spinning solution;

step 2, preparation of the PASA-TPU spinning solution:

weighing 1 g of the thermoplastic polyurethane elastomer rubber particles and 5 g of the PASA powder prepared in the step 1; dispersing the particles and the powder in 10 ml of the N,N-dimethylformamide solution; carrying out magnetic stirring at a controlled rotation speed of 300 rmp for 24 h so as to obtain a 5 g-PASA-TPU spinning solution (5 g represents that the spinning solution contains 5 g of PASA solid powder and is used for distinguishing PASA-TPU spinning solutions with other contents);

step 3, preparation of the TB-PAN spinning solution:

respectively weighing 1 g of polyacrylonitrile fiber powder, 1 g of boron nitride powder and 1.5 g of triphenyl phosphate powder; dispersing the polyacrylonitrile fiber powder, the boron nitride powder and the triphenyl phosphate powder in 10 ml of the DMF solution; and carrying out magnetic stirring at a controlled rotation speed of 300 rmp for 24 h so as to obtain the TB-PAN spinning solution;

step 4, preparation of a 5 g-PASA-TPU phase-change flame-retardant fiber material in an electrostatic spinning manner:

respectively extracting the 5 g-PASA-TPU spinning solution prepared in the step 2 and the TB-PAN spinning solution prepared in the step 3 into two 10 ml injectors; connecting the injectors with the coaxial spinning needles; controlling the liquid discharge of a 5 g-PASA-TPU injector by the injection part A in the electrostatic spinning machine; controlling the liquid discharge by the injection part B; and fixing the aluminum foil paper on the receiver for receiving the fibers. Further preferably, the step 4 includes: controlling the environment temperature to be 25° C., and controlling the humidity to be 45%; setting the rotation speed of the receiver to be 100 rmp, setting the liquid discharge speed of the injection part A to be 0.12 mm/min, and setting the liquid discharge speed of the injection part B to be 0.20 mm/min; setting the horizontal movement distance to be 20 mm, setting the distance between the spinning needles and the receiver to be 25 cm, setting the positive voltage of the electrostatic spinning machine to be 15 KV, and setting the negative voltage to be 1.7 KV; and then starting the electrostatic spinning machine to spin the phase-change flame-retardant fiber material.

Further preferably, in step 2, the mass ratio of PASA powder to thermoplastic polyurethane elastomer rubber particles in the 5 g-PASA-TPU spinning solution is 5:1.

Compared with the prior art, the present disclosure has the following beneficial effects:

The prepared phase-change flame-retardant fiber material prepared by the present disclosure includes two parts of the composite phase-change fiber material (PASA-TPU) and the flame-retardant fiber material (TB-PAN) according to functional division; the composite phase-change fiber material consists of the phase-change material (PASA) for heat absorption and a polymer substrate TPU for fixing the form and enhancing the toughness of the material; and the flame-retardant fiber material comprises a polymer substrate PAN for fixing the form, boron nitride (BN) for enhancing heat conduction of the material and triphenyl phosphate (TPP) for improving the flame-retardant effect of the material. The phase-change fiber material has relatively large latent heat of phase change and can absorb a large amount of heat generated by the lithium ion battery during the charge-discharge process, so that the temperature on the battery surface can be effectively reduced; and meanwhile, the toughness of the material can be enhanced by the TPU, and thus the service life of the material is prolonged. The flame-retardant fiber material is compact in structure and full in fibers; thermal decomposition is generated only at 200° C. or above according to thermal analysis test, which indicates that the phase-change flame-retardant fiber material is relatively good in thermal stability. The phase-change fiber material is well wrapped with the flame-retardant fiber material, and the lithium ion battery wrapping the whole phase-change flame-retardant fiber material in the closed space is subjected to charge-discharge cycle; the result shows that the surface temperature of the battery can be effectively reduced by about 20° C. by the material; the material can effectively play a role in multiple cycle processes; the whole material has excellent and stable heat absorption effect and has no leakage and collapse; and the phase-change flame-retardant fiber material only has thermal shrinkage and blackening phenomena and is not combusted after being ignited by open fire for over 20 s; and phase-change flame-retardant fiber material of the present disclosure has a relatively good flame-retardant effect compared with other phase-change materials. Meanwhile, the electrostatic spinning manner is adopted in the present disclosure, so that the prepared material is relatively small in integral thickness and low in space occupancy, and can be effectively applied to a thermal management scene of the lithium ion battery in the closed space.

DETAILED DESCRIPTION OF THE INVENTION

Figure 1:
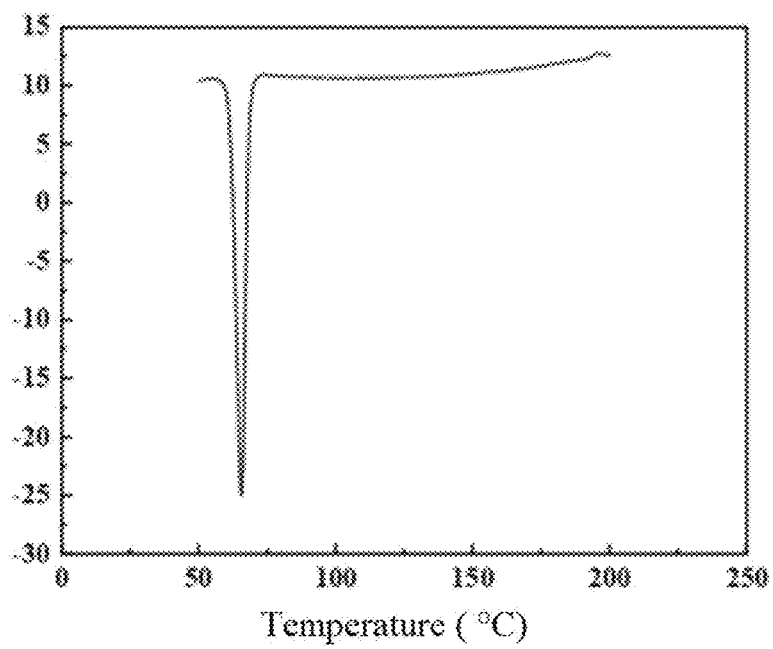
FIG. 1 is a differential scanning calorimetry (DSC) curve of a PASA sample in a nitrogen atmosphere.
Figure 2:
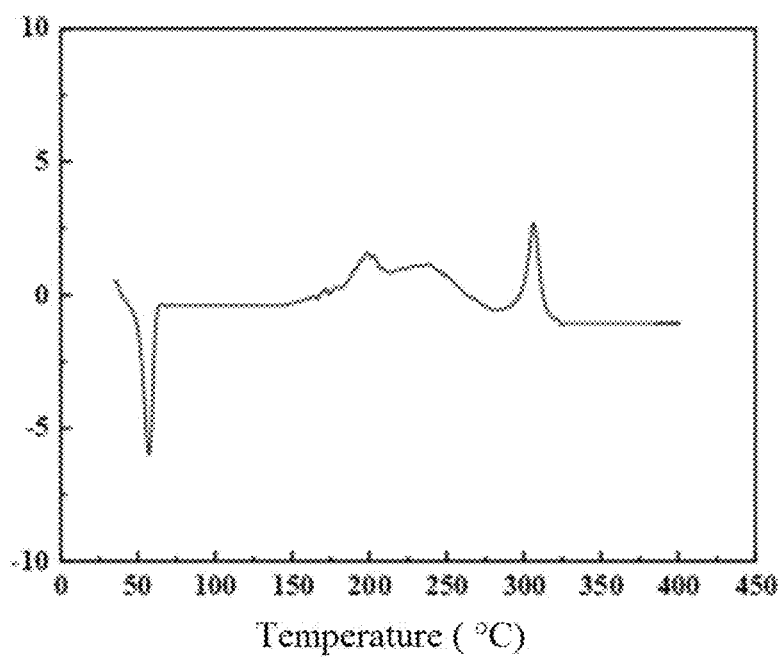
FIG. 2 is a differential scanning calorimetry (DSC) curve of a partial sample of a 1 g-PASA-TPU phase-change flame-retardant fiber material containing 1 g of PASA in a nitrogen atmosphere.
Figure 3:
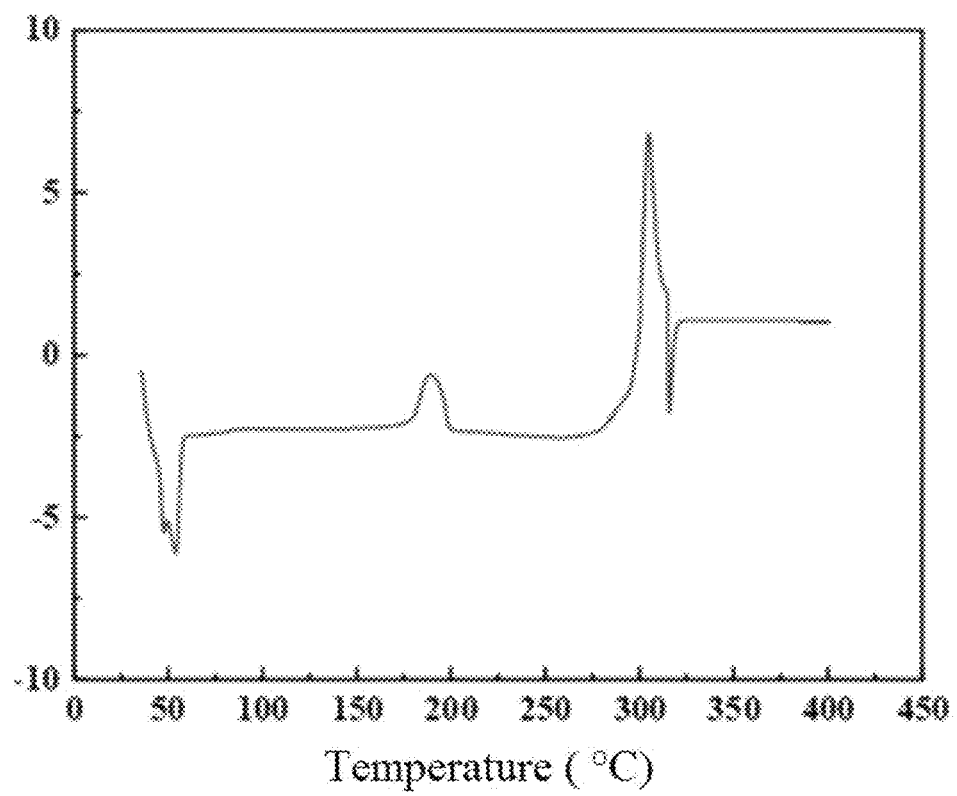
FIG. 3 is a differential scanning calorimetry (DSC) curve of a partial sample of a 2 g-PASA-TPU phase-change flame-retardant fiber material containing 2 g of PASA in a nitrogen atmosphere.
Figure 4:
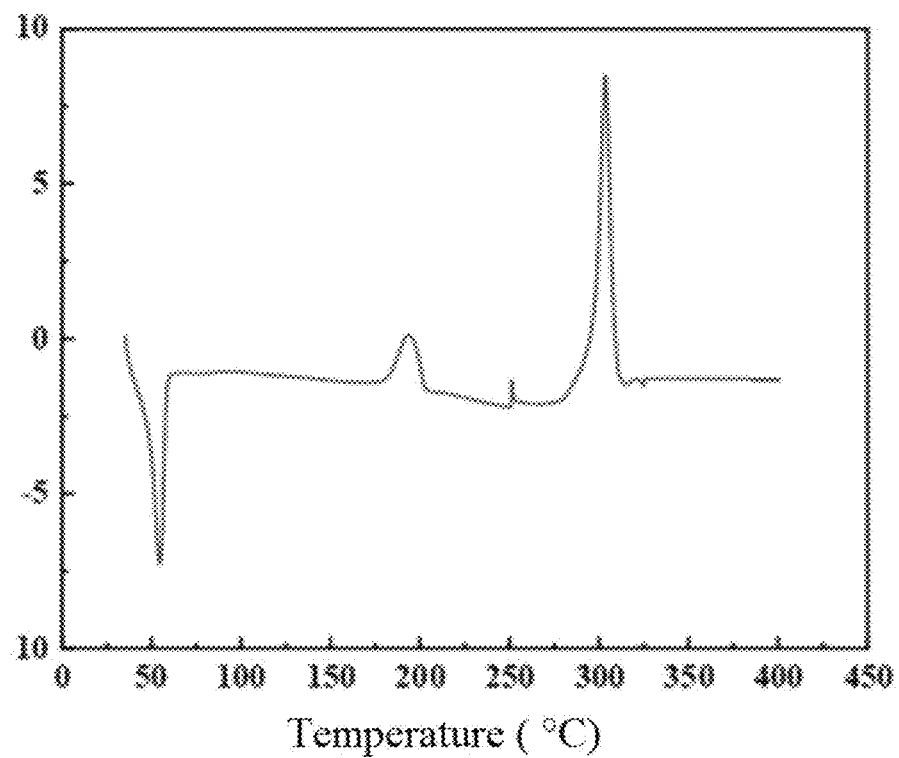
FIG. 4 is a differential scanning calorimetry (DSC) curve of a partial sample of a 4 g-PASA-TPU phase-change flame-retardant fiber material containing 4 g of PASA in a nitrogen atmosphere.
Figure 5:
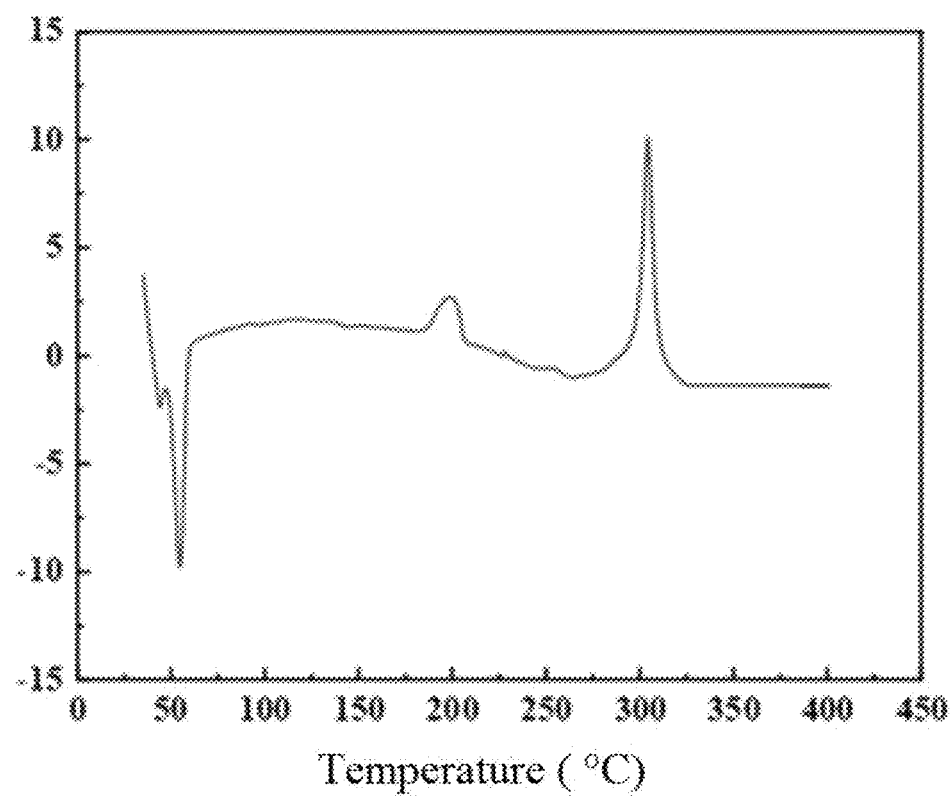
FIG. 5 is a differential scanning calorimetry (DSC) curve of a partial sample of a 5 g-PASA-TPU phase-change flame-retardant fiber material containing 5 g of PASA in a nitrogen atmosphere.

To make a purpose, a technical solution and advantages of embodiments of the present disclosure more clear, the technical solution in the present disclosure will be clearly and fully described below in combination with drawings. Apparently, the described embodiments are merely part of the embodiments of the present disclosure, not all of the embodiments. Based on the embodiments in the present disclosure, all other embodiments obtained by those ordinary skilled in the art without contributing creative labor will belong to the protection scope of the present disclosure.

Embodiment 1

A preparation method of a phase-change flame-retardant fiber material for thermal management of a lithium ion battery includes:

Step 1, preparation of a PASA eutectic mixture:
a preparation method of each PASA eutectic mixture includes the following steps: weighing 7.56 g of palmitic acid (PA) powder and 5.04 g of stearic acid (SA) powder; placing the PA powder and the SA powder in a 50 ml beaker and uniformly mixing; then placing the beaker in a drying oven at 90° C., and maintaining the temperature for 2 h; preheating an ultrasonic machine to reach 90° C.; placing the molten PA and SA mixed solution in the ultrasonic machine at 90° C.; carrying out ultrasonic treatment for 10 min; naturally cooling to obtain the PASA eutectic mixture, and grinding the PASA eutectic mixture into powder for subsequent preparation of a spinning solution.

Step 2, preparation of a 5 g-PASA-TPU spinning solution: weighing 1 g of thermoplastic polyurethane elastomer rubber (TPU) particles and 5 g of the PASA powder prepared in the step 1; dispersing the particles and the powder in 10 ml of a N,N-dimethylformamide (DMF) solution; and carrying out magnetic stirring at a controlled rotation speed of 300 rmp for 24 h so as to obtain the 5 g-PASA-TPU spinning solution.

Step 3, preparation of a TB-PAN spinning solution:
respectively weighing 1 g of polyacrylonitrile (PAN) powder, 1 g of boron nitride powder and 1.5 g of triphenyl phosphate powder; dispersing and dissolving the polyacrylonitrile powder, the boron nitride powder and the triphenyl phosphate powder in the DMF solution; and carrying out magnetic stirring at a controlled rotation speed of 300 rmp for 24 h so as to obtain the TB-PAN spinning solution.

Step 4, preparation of a 5 g-PASA-TPU phase-change flame-retardant fiber in an electrostatic spinning manner:
respectively extracting the PASA-TPU spinning solution prepared in the step 2 and the TB-PAN spinning solution prepared in the step 3 into two 10 ml injectors; connecting the injectors with coaxial spinning needles; controlling environment temperature to be 25° C., and controlling the humidity to be 45%; controlling the liquid discharge of a 5 g-PASA-TPU injector by an injection part A in an electrostatic spinning machine, and controlling the discharge liquid of a TB-PAN injector by an injection part B; fixing aluminum-foil paper on a receiver for receiving fibers; setting the rotation speed of the receiver to be 100 rmp, setting the liquid discharging speed of the injection part A to be 0.12 mm/min, and setting the liquid discharging speed of the injection part B to be 0.20 mm/min; setting the horizontal moving distance to be 20 mm, setting the distance between the spinning needles and the receiver to be 25 cm, setting the positive voltage of the electrostatic spinning machine to be 15 KV, and setting the negative voltage to be 1.7 KV; then starting the electrostatic spinning machine to spin the 5 g-PASA-TPU phase-change flame-retardant fiber material.

Embodiment 2

A specific method for preparing the polyacrylonitrile fiber material (PAN) in an electrostatic spinning manner includes:

Step 1, weighing 1 g of polyacrylonitrile powder; dispersing and dissolving the polyacrylonitrile powder in 10 ml of a DMF solution; and carrying out magnetic stirring at a controlled rotation speed of 300 rmp for 24 h to obtain a PAN spinning solution.

Step 2, extracting the PAN spinning solution prepared in the step 1 into a 10 ml injector, and connecting the injector with a spinning needle; controlling the environment temperature to be 25° C., and controlling the humidity to be 45%; controlling the liquid discharge of a PAN injector by an injection part A in an electrostatic spinning machine; fixing aluminum-foil paper on a receiver for receiving fibers; setting the rotation speed of the receiver to be 100 rmp, and setting the liquid discharging speed of the injection part A to be 0.12 mm/min; setting the horizontal moving distance to be 20 mm, setting the distance between the spinning needles and the receiver to be 25 cm, setting the positive voltage of the electrostatic spinning machine to be 15 KV, and setting the negative voltage to be 1.7 KV; and starting the electrostatic spinning machine was started to spin the PAN fiber material.

Figure 6:
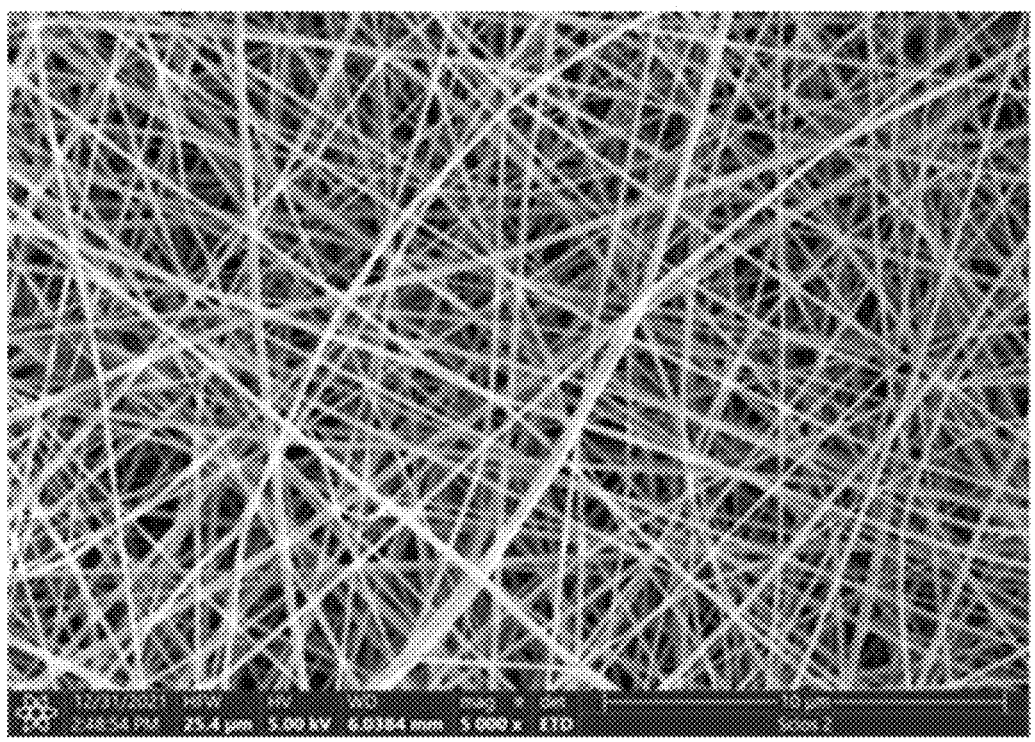
FIG. 6 is an SEM image of a pure polyacrylonitrile fiber.
Figure 7:
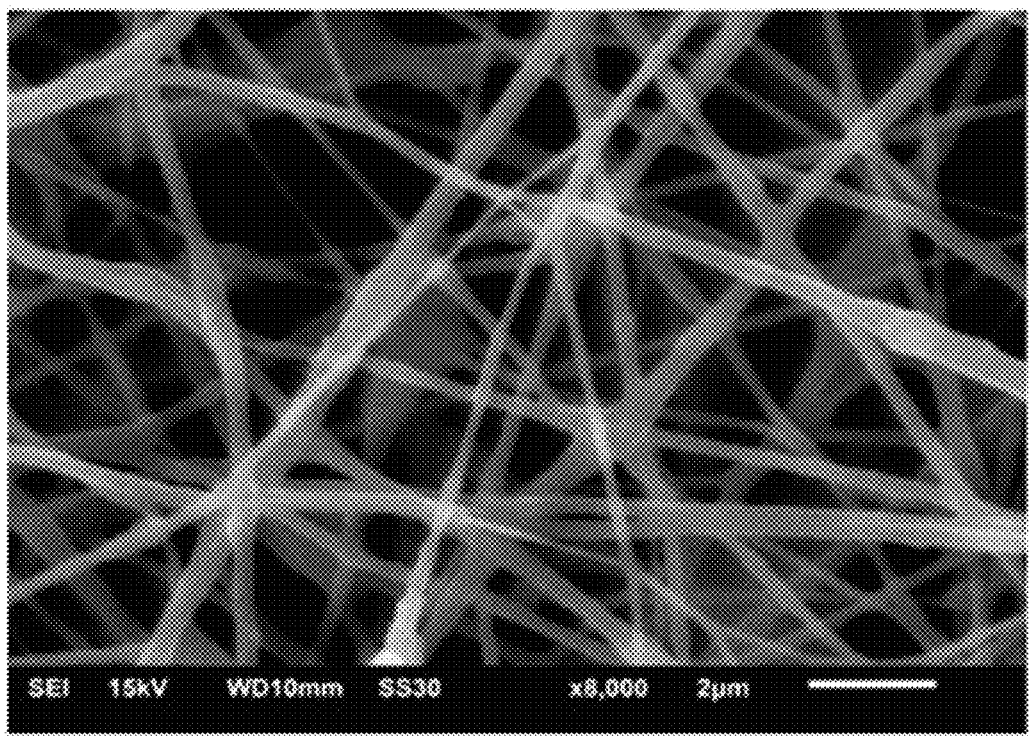
FIG. 7 is a local SEM enlarged image of 5 g-PASA-TPU phase-change flame-retardant fiber under 8000 multiplying power.
Figure 8:
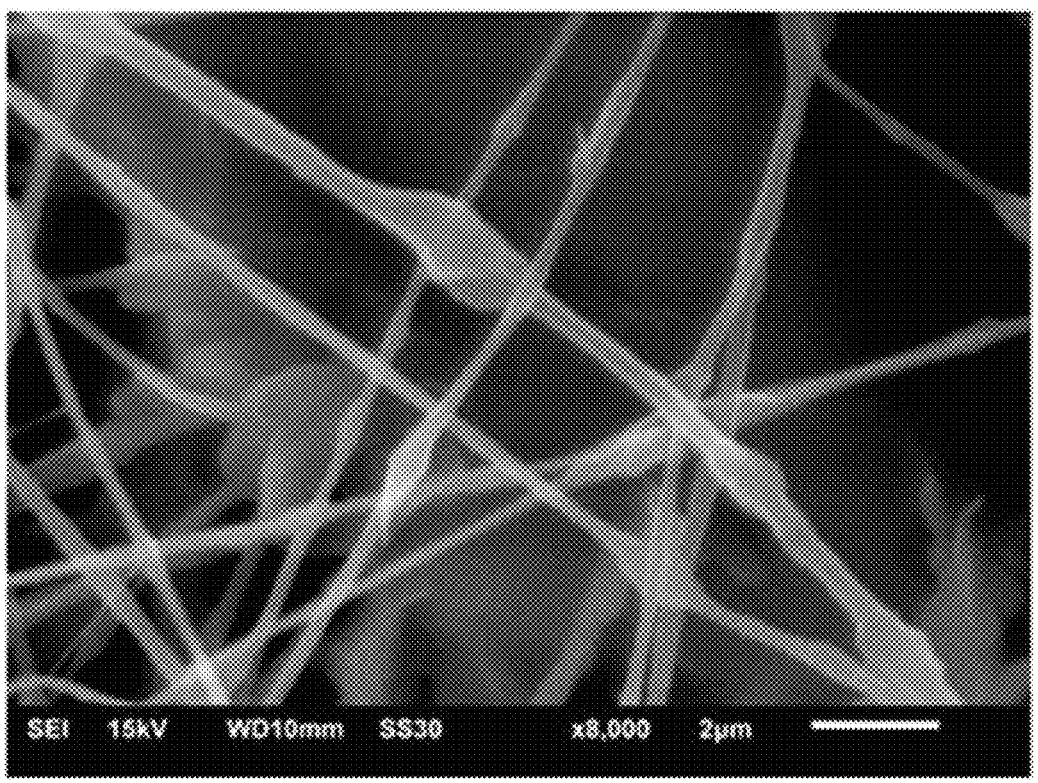
FIG. 8 is a local SEM enlarged image of a single 5 g-PASA-TPU phase-change flame-retardant fiber.

As shown in the SEM image of the pure polyacrylonitrile fiber in FIG. 6, the polyacrylonitrile fibers have a compact structure; FIG. 7 and FIG. 8 are SEM images of the 5 g-PASA-TPU phase-change flame-retardant fibers prepared in the Embodiment 1; compared with the SEM image in FIG. 6, the phase-change fibers have the advantages that the diameters are obviously increased, the surfaces of the fibers are rougher, and the phase-change material is well wrapped with the polyacrylonitrile flame-retardant fibers.

Embodiment 3

A specific method for respectively preparing phase-change flame-retardant fibers of 1 g-PASA-TPU, 2 g-PASA-TPU and 4 g-PASA-TPU includes:

Step 1, preparation of a 1 g-PASA-TPU spinning solution:
weighing 1 g of thermoplastic polyurethane elastomer rubber (TPU) particles and 1 g of PASA powder; dispersing the particles and the powder into 10 ml of a N,N-Dimethylformamide (DMF) solution; and carrying out magnetic stirring at a controlled rotation speed of 300 rmp for 24 h so as to obtain the 1 g-PASA-TPU spinning solution.

Step 2, preparation of a TB-PAN spinning solution:
weighing 1 g of polyacrylonitrile (PAN) powder, 1 g of boron nitride powder and 1.5 g of triphenyl phosphate powder respectively; dispersing and dissolving the polyacrylonitrile powder, the boron nitride powder and the triphenyl phosphate powder into the DMF solution; and carrying out magnetic stirring at a controlled rotation speed of 300 rmp for 24 h so as to obtain the TB-PAN spinning solution.

Step 3, preparation of a 1 g-PASA-TPU phase-change flame-retardant fiber in an electrostatic spinning manner:
extracting the 1 g-PASA-TPU spinning solution prepared in the step 1 and the TB-PAN spinning solution prepared in the step 2 into two 10 ml injectors; connecting the injectors with coaxial spinning needles; controlling the environment temperature to be 25° C., and controlling the humidity to be 45%; controlling the liquid discharge of a 5 g-PASA-TPU injector by an injection part A in an electrostatic spinning machine, and controlling the liquid discharge of the TB-PAN injector by an injection part B; fixing aluminum-foil paper on a receiver for receiving fibers; setting the rotation speed of the receiver to be 100 rmp, setting the liquid discharging speed of the injection part A to be 0.12 mm/min, and setting the liquid discharging speed of the injection part B to be 0.20 mm/min; setting the horizontal moving distance to be 20 mm, setting the distance between the spinning needles and the receiver to be 25 cm, setting the positive voltage of the electrostatic spinning machine to be 15 KV, and setting the negative voltage to be 1.7 KV; and then starting the electrostatic spinning machine to spin the 5 g-PASA-TPU phase-change flame-retardant fiber material.

2 g-PASA-TPU and 4 g-PASA-TPU were prepared only by changing the mass of TPU in the step 1 to 2 g and 4 g, and the other preparation methods were the same as the steps 2 and 3. The method for preparing PASA powder in this embodiment was the same as the method in the Embodiment 1. The thicknesses of the 5 g-PASA-TPU phase-change flame-retardant fiber material, the polyacrylonitrile fiber (PAN) material, the 1 g-PASA-TPU phase-change flame-retardant fiber material, the 2 g-PASA-TPU phase-change flame-retardant fiber material and the 4 g-PASA-TPU phase-change flame-retardant fiber material prepared in the Embodiments 1, 2 and 3 were measured respectively by a high-accuracy 1/10 micrometer. The measurement results are shown in Table 1.

TABLE 1

Thickness of fiber materials

| No. | First measurement/mm | Second measurement/mm | Third measurement/mm | Mean/mm |
|---|---|---|---|---|
| PAN | 0.0934 | 0.0868 | 0.0866 | 0.0890 |
| 1 g-PASA-TPU | 0.1088 | 0.1379 | 0.1489 | 0.1319 |
| 2 g-PASA-TPU | 0.1903 | 0.1697 | 0.1809 | 0.1803 |
| 4 g-PASA-TPU | 0.1938 | 0.2010 | 0.2618 | 0.2189 |
| 5 g-PASA-TPU | 0.3274 | 0.3915 | 0.3123 | 0.3437 |

The measurement shows the thickness of the PASA-TPU phase-change flame-retardant fiber material is increased with the increase of the phase-change material PASA, but the thickness is still kept at a relatively low level, and the space occupancy is relatively low.

Embodiment 4

DSC test on PASA and PASA-TPU phase-change flame-retardant fiber with different masses includes the following steps:

respectively taking 3-5 mg of PASA powder and PASA-TPU phase-change flame-retardant fiber materials with different PASA contents, and placing the PASA powder and the PASA-TPU phase-change flame-retardant fiber materials in an alumina crucible; sealing the crucible with a sealing tablet press; placing the crucible in a DSC instrument; selecting temperature intervals of 30-300° C. and 30-500° C., and controlling the flow rate of nitrogen to be 60 ml/min; starting a DSC experiment; and determining a heat absorption temperature interval of a reactant according to a DSC curve, and calculating the heat absorption capacity of the reactant under unit mass. The experimental result is shown in Table 2.

TABLE 2

DSC data of the PASA-TPU phase-change flame-retardant fiber materials with different PASA contents

| Substances | Initial heat absorption temperature (° C.) | End heat absorption temperature (° C.) | Heat absorption peak temperature (° C.) | Heat absorption capacity (Jg$^{-1}$) |
|---|---|---|---|---|
| PASA | 58.67 | 72.33 | 65.66 | 242.45 |
| 1 g-PASA-TPU flame-retardant phase-change material | 42.50 | 65.17 | 56.93 | 77-33 |
| 2 g-PASA-TPU flame-retardant phase-change material | 41.33 | 62.17 | 54.17 | 78.18 |
| 4 g-PASA-TPU flame-retardant phase-change material | 42.67 | 66.33 | 54.17 | 83.48 |

TABLE 2-continued

DSC data of the PASA-TPU phase-change flame-retardant fiber materials with different PASA contents

| Substances | Initial heat absorption temperature (° C.) | End heat absorption temperature (° C.) | Heat absorption peak temperature (° C.) | Heat absorption capacity (Jg$^{-1}$) |
|---|---|---|---|---|
| 5 g-PASA-TPU flame-retardant phase-change material | 39.33 | 61.17 | 54.67 | 147.70 |

As shown in FIG. 1 and Table 1, the differential scanning calorimetry (DSC) curve of the PASA sample in the nitrogen atmosphere shows phase-change heat absorption occurs at the temperature of 58.67-72.33° C. and reaches a heat absorption peak value at the temperature of 65.66° C.; and the enthalpy change of PASA is 242.45 J·g$^{-1}$ through heat absorption capacity calculation, that is, 1 g of PASA can absorb heat of 242.45 J. Therefore, the phase-change material has a relatively good phase-change heat absorption effect. Meanwhile, the material does not generate a thermal decomposition reaction within 200° C., so that the phase-change flame-retardant fiber material is suitable for an application scene of thermal management of the lithium ion battery.

As shown in FIGS. 2-5, the DSC curve of phase-change fiber sample with different contents in the nitrogen atmosphere is researched. As shown in the figures, phase-change heat absorption occurs at the temperature of 40-65° C., and mostly reaches the heat absorption peak at 54.17° C.; and the heat absorption capacity of the phase-change fiber is gradually increased with increase of the content of PASA. The content of PASA is 5 g or above, so the viscosity of the spinning solution is too high and spinning is not easy to carry out. Therefore, the optimal mass of PASA in the spinning solution is determined to be 5 g; and the enthalpy change of the 5 g-PASA-TPU phase-change flame-retardant fiber material is calculated to be 147.7 J·g$^{-1}$ through the heat absorption capacity.

Embodiment 5

Test on thermal management of 5 g-PASA-TPU phase-change flame-retardant fiber material to lithium ion battery in closed space includes the following steps:
  selecting a commercially available 2,000 mAh soft package lithium ion battery as an experimental object; performing 3C cycle charge and discharge on the battery through a LAND battery cycle charge and discharge system; fixing a K-type thermocouple on a surface of the battery 1, and placing in a drying oven with the temperature of 30° C.; and collecting temperature data through an ART temperature acquisition module to obtain temperature data of a blank control group without wrapping the phase-change flame-retardant fiber material, as shown in Table 3;
  uniformly wrapping the surface of the battery of the same model with the 5 g-PASA-TPU phase-change flame-retardant fiber material; performing the same 3C charge and discharge cycle; fixing the K-type thermocouple between the phase-change flame-retardant fiber material and the battery; measuring the surface temperature of the battery 2 to obtain temperature data of the experimental group wrapping the phase-change flame-retardant fiber material; and meanwhile, taking another K-type thermocouple to measure the environment temperature data in the drying oven in real time, thereby ensuring the environment temperature stability.

TABLE 3

Key temperature point for thermal management test of lithium ion battery in blank group and lithium ion battery in experimental group

| | Blank group | | Experimental group | |
|---|---|---|---|---|
| Cycle period | Initial temperature | Maximum temperature | Initial temperature | Maximum temperature |
| 1 | 30.85 | 88.37 | 30.85 | 66.31 |
| 2 | 32.71 | 91.47 | 32.47 | 67.78 |
| 3 | 32.95 | 93.41 | 32.93 | 67.76 |
| 4 | 32.91 | 94.72 | 32.85 | 66.85 |
| 5 | 32.63 | 67.41 | 32.43 | 67.54 |

Figure 9:
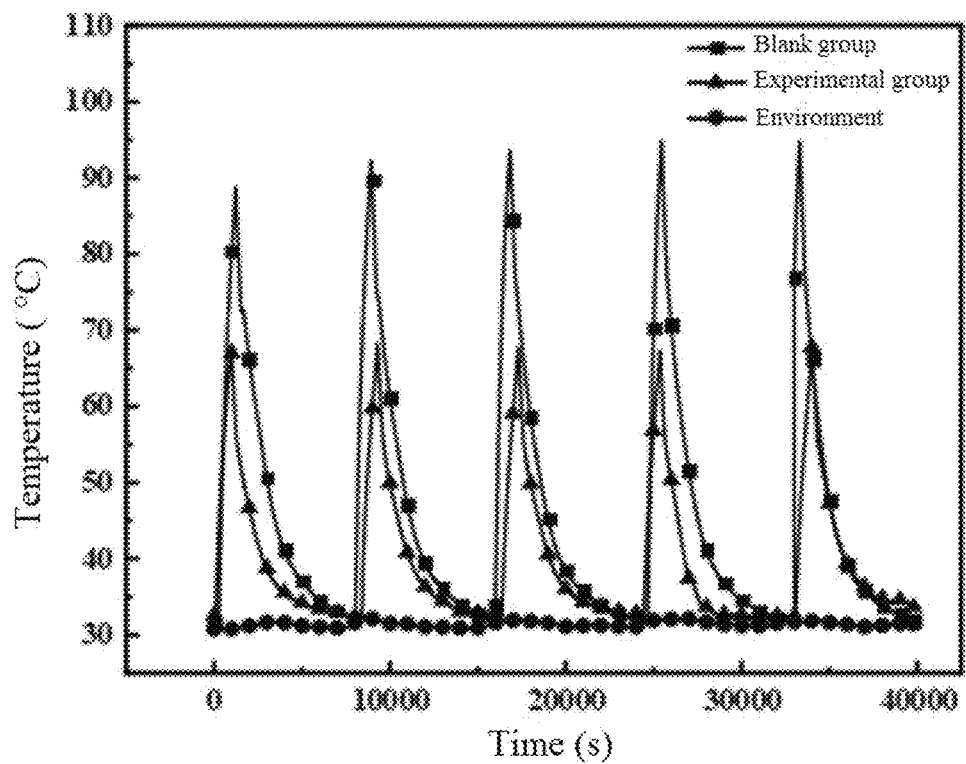
FIG. 9 is a temperature contrast curve of a 5 g-PASA-TPU phase-change flame-retardant fiber in thermal management of a lithium ion battery.

In this embodiment, the lithium ion battery in the blank group and the lithium ion battery wrapping the phase-change flame-retardant fiber material were subjected to five times of charge-discharge cycle experiments. A measured temperature curve of thermal management of the batteries is as shown in FIG. 9; pipe fitting values such as initial temperature and highest temperature are shown in Table 3. Temperature values of part of temperature points in the first charge-discharge experiment are selected as shown in Table 4, and one point is recorded every 383 seconds.

TABLE 4

Part of temperature points of 1$^{st}$ cycle of thermal management test of lithium ion battery in blank group and lithium ion battery in experimental group

| No. | Time (s) | Black group Temperature ° C. | Experimental group Temperature ° C. | Environment Temperature ° C. |
|---|---|---|---|---|
| 1 | 15713 | 32.95 | 32.93 | 31.7 |
| 2 | 16095 | 72.54 | 51.81 | 31.8 |
| 3 | 16861 | 91.60 | 63.56 | 31.88 |
| 4 | 17244 | 76.83 | 58.08 | 31.92 |
| 5 | 17627 | 67.38 | 50.82 | 31.94 |
| 6 | 18010 | 60.50 | 46.76 | 31.84 |
| 7 | 18393 | 54.47 | 43.16 | 31.68 |
| 8 | 18776 | 48.72 | 40.47 | 31.58 |
| 9 | 19159 | 44.71 | 38.05 | 31.68 |
| 10 | 19542 | 41.52 | 37.21 | 31.44 |
| 11 | 19925 | 39.38 | 35.69 | 31.24 |
| 12 | 20308 | 37.85 | 34.71 | 31.08 |
| 13 | 20691 | 36.68 | 34.36 | 31.06 |
| 14 | 21074 | 35.9 | 34.06 | 31.26 |
| 15 | 21457 | 35.13 | 33.88 | 31.30 |
| 16 | 21840 | 33.82 | 33.70 | 31.32 |
| 17 | 22223 | 33.74 | 33.41 | 31.22 |
| 18 | 22606 | 33.41 | 33.19 | 31.30 |
| 19 | 22989 | 33.17 | 32.85 | 31.20 |
| 20 | 23372 | 32.93 | 32.41 | 31.02 |

As shown in FIG. 9, the temperature curves of thermal management of the lithium ion battery in the blank group and the lithium ion battery wrapping the phase-change flame-retardant fiber material are compared; the image shows that when the environment temperature is 30° C., the battery in the blank group, namely a battery 1 in the figure, may generate a large amount of heat during charge-discharge cycle, so the surface temperature of the battery reaches 90° C. or above; after the phase-change flame-retardant fiber is applied, the battery, namely a battery 2 in the figure, is subjected to heat absorption through the phase-change material in the fiber, and the temperature difference can reach 20° C., so the surface temperature of the battery is effectively reduced. Therefore, the battery can be subjected to charge-discharge cycle at a relatively safe temperature, and the safety of the battery in the charge-discharge process is greatly improved.

Embodiment 6

Fire resistance and flame retardance comparison test of 5 g-PASA-TPU phase-change flame-retardant fiber material includes the following steps:
 clamping a pure PAN fiber material with the size of 3 cm*3 cm and the 5 g-PASA-TPU phase-change flame-retardant fiber material with the same size by sharp-nose tweezers;
 controlling the distance between flame and the material to be within 0.5 cm and maintained for over 20 s; and observing an ignition condition and an ignited form of the material so as to respectively test the fire resistance and flame retardance of the pure PAN fiber material and the 5 g-PASA-TPU phase-change flame-retardant fiber material.

Figure 10:
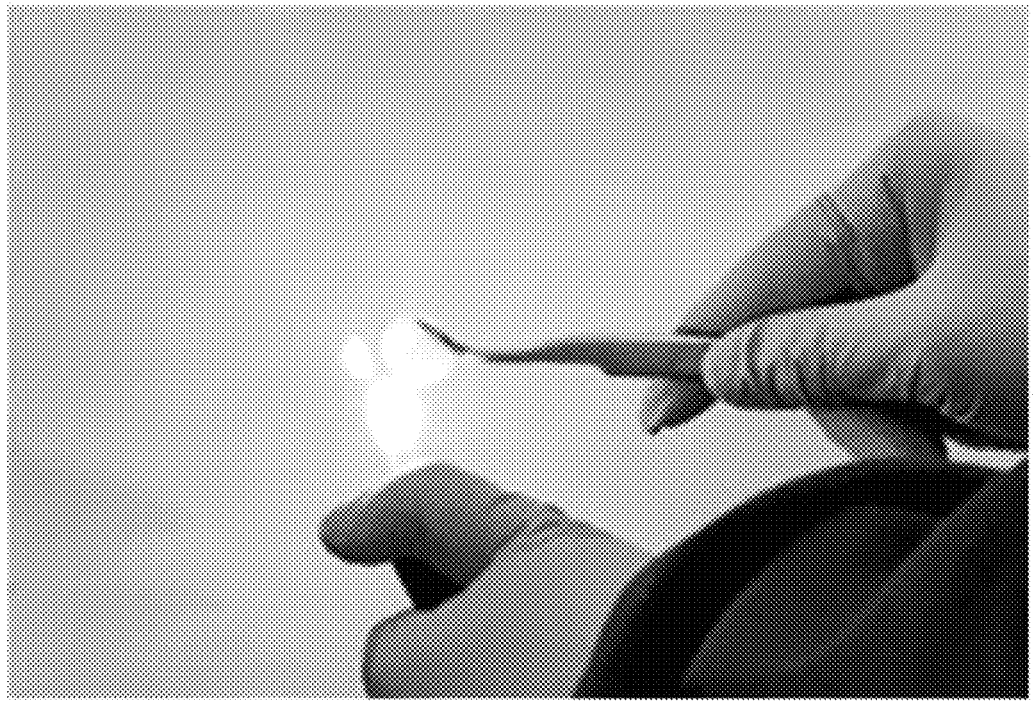
FIG. 10 is a combustion test schematic diagram of a pure polyacrylonitrile fiber.
Figure 11:
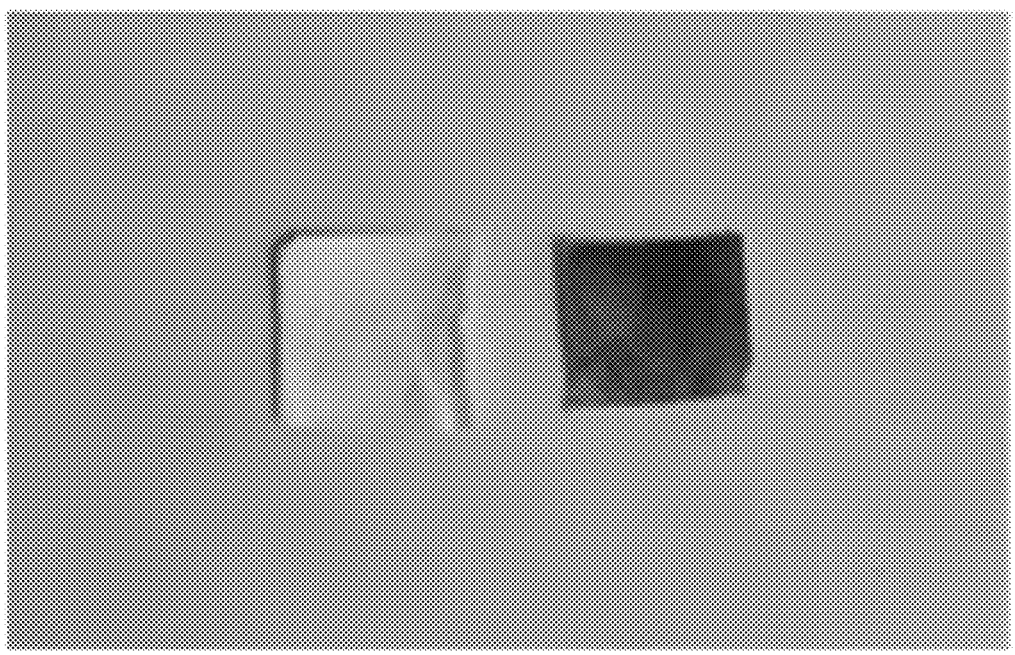
FIG. 11 is a contrast image of a 5 g-PASA-TPU phase-change flame-retardant fiber material before and after combustion.

The flame retardance of the pure polyacrylonitrile fiber material and the phase-change flame-retardant fiber material under the ignition condition was researched and compared as shown in FIGS. 10 and 11. FIG. 10 is an effect of ignited pure polyacrylonitrile, and shows that the polyacrylonitrile material may combust. The left of the FIG. 11 is a surface effect figure of the 5 g-PASA-TPU phase-change flame-retardant fiber before ignition, and the right side of the FIG. 11 is a surface effect figure of the 5 g-PASA-TPU phase-change flame-retardant fiber after ignition. It can be seen from the figures that the phase-change flame-retardant fiber is in a white flat state before ignition, is not combusted after ignition, only has a certain degree of heat shrinkage phenomenon, is blackened in surface and does not have a combusting phenomenon. Therefore, the phase-change flame-retardant fiber can be proved to have certain fire resistance and flame retardance.

Inspired by the above ideal embodiment of the present disclosure, the relevant staff can make various changes and modifications within the scope of not deviating from the technical idea of the present disclosure. The technical scope of the present disclosure is not limited to the contents of the specification, and its technical scope must be determined according to the scope of the claims.

The invention claimed is:

1. A phase-change flame-retardant fiber material for thermal management of a lithium ion battery in a closed space, prepared in a coaxial electrostatic spinning manner, comprising a composite phase-change fiber material PASA-TPU at a core part and a flame-retardant fiber material TB-PAN wrapping a surface of the core part;
 the composite phase-change fiber material PASA-TPU comprises the following components: palmitic acid powder, stearic acid powder and thermoplastic polyurethane elastomer rubber particles; and a mass ratio of the palmitic acid powder to the stearic acid powder to the thermoplastic polyurethane elastomer rubber particles is 3:2:1;
 the flame-retardant fiber material TB-PAN comprises the following components: polyacrylonitrile, boron nitride and triphenyl phosphate based on a mass ratio of 2:2:3.

* * * * *